US005630191A

United States Patent [19]
Hasuda

[11] Patent Number: 5,630,191
[45] Date of Patent: May 13, 1997

[54] SHUTTER DEVICE

[75] Inventor: Masanori Hasuda, Kanagawa-ken, Japan

[73] Assignee: Nikon Corporation, Tokyo, Japan

[21] Appl. No.: 578,022

[22] Filed: Dec. 26, 1995

[30] Foreign Application Priority Data

Feb. 1, 1995 [JP] Japan .................................. 7-036007

[51] Int. Cl.$^6$ .................................................. G03B 9/40
[52] U.S. Cl. ................................................... 396/492
[58] Field of Search ............................ 354/245, 246–247, 354/248, 435–431; 396/246, 492, 484

[56] References Cited

U.S. PATENT DOCUMENTS 4,557,573 12/1985 Johnson et al. ..................... 354/234.1
5,134,435 7/1992 Tsuboi et al. .......................... 354/435
5,220,376 6/1993 Tagami .................................. 354/435
5,371,565 12/1994 Matsubara et al. .................... 354/246
5,457,514 10/1995 Hasuda et al. ........................ 354/431

*Primary Examiner*—W. B. Perkey
*Attorney, Agent, or Firm*—Oliff & Berridge

[57] ABSTRACT

A mechanism wherein the operation state of a shutter is detectable even with a diaphragm plate, without light shading blades being damaged, is disclosed. The mechanism includes a substrate, a cover plate, and a light blocking blade between the substrate and the cover plate. A diaphragm plate is between the light blocking blade and the substrate or the cover plate. A traveling state detection device uses detection holes to detect the traveling state of the light shading blade at a position corresponding to the traveling state detection device of the diaphragm plate.

18 Claims, 3 Drawing Sheets

SHUTTER DEVICE

BACKGROUND OF THE INVENTION

1. Field of the Invention

The present invention relates to a shutter device of a camera comprising a traveling state detection device.

2. Background of Related Art

A known mechanism around the light blocking blade of a focal plane shutter of a camera has a structure as shown in FIG. 4, an exploded perspective side view of the shutter mechanism. The substrate 1 and the cover plate 2 are positioned substantially parallel with holes 1b, 1c, 1d and 1e aligned with holes 2b, 2c, 2d, and 2e, respectively and connected by rods 7, 8, and 9. Moreover, exposure openings 1a and 2a are provided on the substrate 1 and the cover plate 2, respectively. Between the substrate 1 and the cover plate 2, four diaphragm plates, 3, 4, 5, and 6, are mounted 2 so that the rods 7 and 8 are inserted into the holes 3a, 3b, 4b, 4c, 5b, 5c, 6a, and 6b as shown in FIG. 4. In addition, the diaphragm plates 4 and 5, as with the substrate 1 and the cover plate 2, include exposure openings 4a and 5a respectively. As known, a front curtain 11 and a rear curtain 12 are positioned between the diaphragm plates 5 and 6, and between diaphragm plates 3 and 4, respectively. The front curtain 11 and the rear curtain 12 are between openings 1a, 2a, 4a, and 5a that are opened and closed by a drive mechanism (not shown) to provide the necessary exposure to a light sensitive film or the like (not shown).

With this type of shutter, exposure to the film image plane commences as the front curtain 11 is removed from the image plane by the depression of the shutter button in a known manner. After a specified time elapses, the rear curtain 12 is operated to cover the film image plane. The travel motion of each curtain is caused by spring force applied mechanically, the commencement of the travel motion being operated by releasing an engagement stop of each curtain.

Previously, these operations have been primarily controlled entirely mechanically. However, in recent years electrical control has also been used. To move the front and rear curtains themselves, a spring force is used as has been done in the past, with the commencement of the movement being controlled based on turning on the electricity to an electromagnet to release engagement with the curtains.

On the other hand, along with faster shutter speeds such as 1/8000 of a second, in recent years use of strobe lights has been substantial, and making the synchronized speed of the strobe light high has become important for high speed photography in a bright environment.

In order to accomplish this objective, the traveling speed of each curtain needs to be increased substantially by increasing the level of the spring force while the width of the slit between the front and the rear curtain is controlled to be narrow. Because of this, at the time of a high-speed exposure of less than 1/8000 of a second, even though the timing of turning on electricity to the electromagnet is accurately controlled, the desired shutter speed may not be obtained due to the actions of release of engagement stopping for the electromagnet with which a mechanical traveling system which includes the spring is endowed. Furthermore, to determine lack of desired operation before film development, an operation state detection device in the shutter for detecting the state of the operation immediately after shooting has been proposed.

Normally with such an operation state detection device, detection beams are emitted from an emitter by a positioning detection element including an emitter and a light receiver, with a reflecting mirror facing the emitter light detector, the beam reflecting off the reflection mirror to the light receiver; the state of opening and closing of the front curtain 11 and the rear curtain 12 being detected by causing the travel of the front curtain 11 and the rear curtain 12 during that time. However, because of the presence of the diaphragm plates 3–6 around the front curtain 11 and the rear curtain 12 as described previously, simply installing an operation state detection device in the shutter creates a problem in which the detection beam is blocked out by the diaphragm plates(s).

SUMMARY OF THE INVENTION

The present invention gives due regard to the above problems and has as an object to provide a mechanism that can detect the operational state of the shutter, even with diaphragm plates, and that does not damage the light blocking blades.

To achieve this objective, the shutter device of the present invention includes a substrate, a cover plate, light blocking blades that travel between the substrate and the cover plate, and a traveling state detection device for the light blocking blades. The shutter device is constructed so that the holes of the diaphragm plates for detection of the traveling state of the light blocking blades are provided in a position aligned with the traveling state detection device.

With a shutter device of the present invention, since the holes of diaphragm plates for detection of the traveling state of the light blocking blades are provided in a position aligned with the traveling state detection device, detection of the traveling state of the shutter becomes possible without the beam for detection being blocked. In addition, the holes for detection are shaped so that they get narrower in the direction of the travel of the blades, so that the shutter blades are not damaged and their durability increases.

BRIEF DESCRIPTION OF THE DRAWINGS

An explanation of the present invention is provided hereafter, with reference to the following figures in which like reference numerals relate to like elements, and wherein.

DETAILED DESCRIPTION OF PREFERRED EMBODIMENTS

Figure 1:
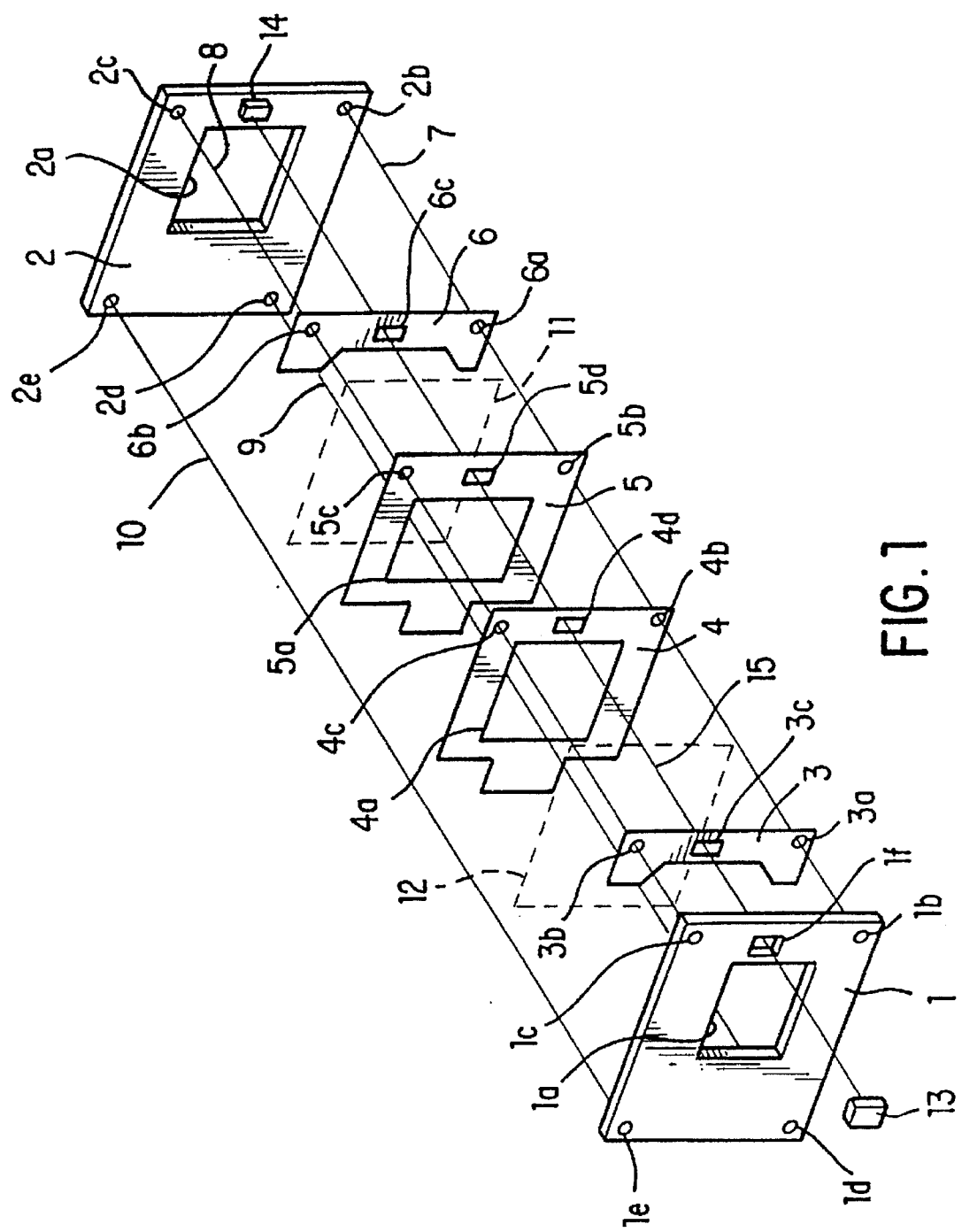
FIG. 1 is an exploded perspective side view of an embodiment of a shutter device according to the present invention.
Figure 4:
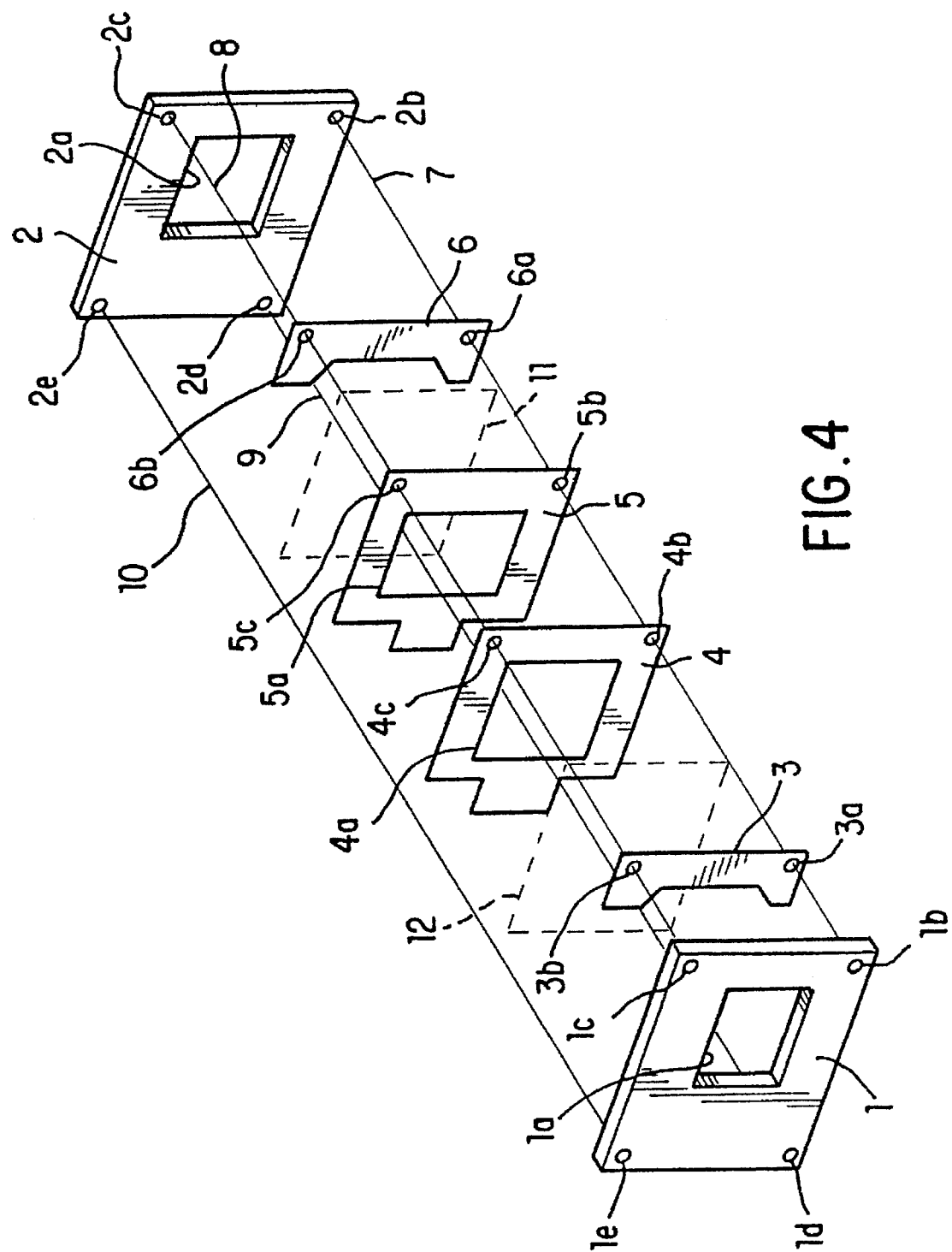
FIG. 4 is an exploded perspective side view of an example of a related art shutter device.

FIG. 1 is an exploded perspective side view showing an embodiment of the shutter device according to the present invention. As with FIG. 4, the mechanism around the light blocking blades of the shutter is shown as being open. Explanations of the structures that are the same as in FIG. 4 are omitted.

In FIG. 1, a detection element 13 includes a light emitter and a light receiver that are installed on the substrate 1. The detection element 13 is held by a hole 1f of the substrate 1. A reflecting mirror 14 is installed on the cover plate 2 and is positioned facing the detection element 13. On the diaphragm plates 3–6, the holes for detection 3c, 4b, 5d, 6c are aligned along a straight line between the detection element 13 and the reflecting mirror 14.

The detection light 15 irradiated from the emitter of the detection element 13, reflects off the reflecting mirror 14 through the detection hole on the substrate 1 and the diaphragm plates 3–6 and is received by the light receiver of the detection element 13. From the motion of the front curtain 11 and the rear curtain 12 that operate to pass or block the detection light 15 through openings 1a, 2a, 4a, and 5a of the substrate 1, the cover plate 2, and the diaphragm plates 4 and 5, respectively, the operational state of the front curtain 11 and the rear curtain 12 is detected.

Namely, when the front curtain 11 or the rear curtain 12 is at a position at which the detection hole(s) on the diaphragm plates are covered, the detecting light is blocked and is not projected to the detection element 13. Therefore, the output of the detection element 13 is at a low level. On the other hand, when the front curtain 11 and the rear curtain 12 are not covering the detecting holes on the diaphragm plates, the detection light 15 is not blocked and the output is at a high level.

With the related exposure motion, between the time of the front curtain 11 passing the detection element 13 and the time of the rear curtain 12 passing the detection element 13, the output from the detection element 13 increases to a high level. As a result, by calculating the time when the output of the detection element 13 reaches a high level, the time of exposure to the light sensitive member can be determined.

Figure 2:
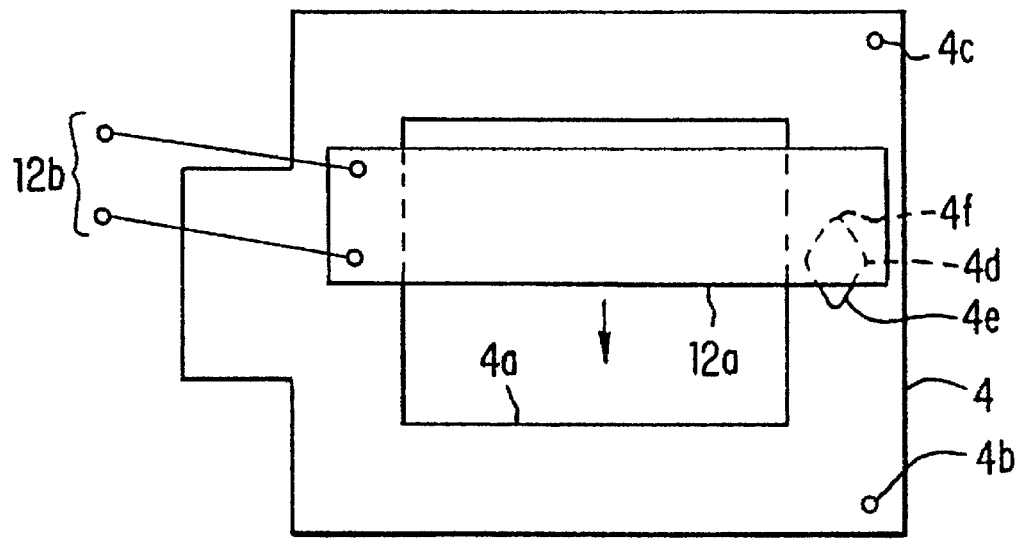
FIG. 2 is a front view of a portion including a detector hole of the shutter device of FIG. 1.

FIG. 2 indicates the relationship between a form of the detecting hole 4d of the diaphragm plate 4 and the slit edge 12a of the slit form light blocking blade of the rear curtain 12 close to the diaphragm plate 4. FIG. 2 is a front view showing the state when the rear curtain 12 partially covers the opening 4a. Even though only one slit form blade is indicated in order to simplify the explanation regarding the rear curtain 12, the rear curtain 12 includes a plurality of blades with a capability of opening and closing the opening 4a and the detecting hole 4d by operation of a well known parallel link mechanism 12b. When the detecting hole 4d is covered as the slit form blade is moved in the direction of the arrow (the direction toward the lower part of FIG. 2) related to completion of the exposure, in order for the slit edge 12a to pass the edge 4e which is a substantially lower part of the detecting hole 4d, the edge 4e is made to be a V-shaped form narrowing in the direction of travel of the rear curtain 12, so that the slit edge 12a does not catch or snag on the edge 4e.

Although not shown in the FIG. 2, other blades have slit edges like the slit edge 12a, with the same potential for damage from catching or snagging when the light blocking blade passes the edge 4e of the detecting hole 4d. After the completion of exposure, when the blade moves in the opposite direction from the arrow, a similar phenomenon occurs when the edge on the opposite side of the blade passes the edge 4f at the upper half of the detection hole 4d. Therefore, the edge 4f of the detection hole 4d desirably has a similar V-shaped form. Therefore, the detection hole 4d is of a rhombic shape.

The detection hole 3c on the diaphragm plate 3 which is also close to the rear curtain 12 is made to be the same shape as the detection hole 4d.

As is known, for similar operation, the diaphragm plate 5 is made with the same opening structure as diaphragm plate 4 and the detecting holes 5d and 6c are made to be the same form as the detection hole 4d.

Figure 3A:
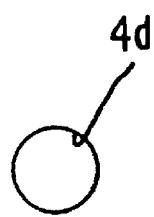
FIGS. 3(a)–3(c) are front views showing alternative detection hole shapes of the shutter device of FIG. 1.
Figure 3B:
Figure 3C:
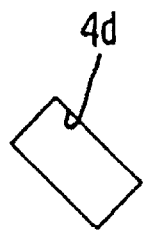

It is obvious that the forms for these detection holes are not limited to the rhombic forms and that these can be, for example, of circular form as shown in FIG. 3(a). They also can be of elliptic form, as shown in FIG. 3(b), or tilted rectangular form, as shown in FIG. 3(c).

According to the shutter device of the present invention, because the detection holes of the diaphragms that detect the traveling state of the light blocking blades are provided at a position aligned with the travel state detection device, the detection of the travel state of the shutter is possible without the detection light being blocked. In addition, since the form of the detection holes are made so that the get narrower in the direction of the travel of the blade, durability increases and the shutter blade(s) are not damaged.

While this invention has been described in conjunction with specific embodiments thereof, it is evident with specific embodiments thereof, it is evident that many alternative, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A shutter device, comprising:
   a substrate;
   a cover plate;
   a diaphragm plate between said substrate and said cover plate and including a first aperture which passes exposure light and a second aperture which defines a different area from the first aperture;
   a light blocking blade that travels between said substrate and said cover plate to alternatively expose and block said first aperture and said second aperture, said second aperture being of varying width in the direction of travel of said light blocking blade; and
   a travelling state detection device that uses a light beam wherein said second aperture is aligned with said travelling state detection device to allow said light beam to pass when said light blocking blade does not block said second aperture in order to detect the travelling state of said light blocking blade.

2. The shutter device of claim 1, wherein said second aperture includes a V-shaped portion with varying width in the direction of travel of said light blocking blade.

3. The shutter device of claim 1, wherein said second aperture is of rhombic shape.

4. The shutter device of claim 1, wherein said second aperture is of circular shape.

5. The shutter device of claim 1, wherein said second aperture is of elliptical shape.

6. The shutter device of claim 1, wherein said second aperture is of rectangular shape with one side tilted relative to the direction of travel of said light blocking blade to provide a varying width opening in said direction of travel.

7. The shutter device of claim 1, further comprising a plurality of diaphragm plates, each plate including said first aperture and said second aperture, all of said second apertures being aligned with one another and with said traveling state detection device.

8. The shutter device of claim 1, wherein said traveling state detection device comprises:
   a light emitter and a light receiver mounted on said substrate; and
   a mirror mounted on said cover plate, wherein light emitted from said light emitter may be reflected from said mirror through said hole to said light receiver.

9. The shutter device of claim 1, further comprising a plurality of light blocking plates.

10. A shutter device, comprising:
    a substrate;

a cover plate;

a diaphragm plate between said substrate and said cover plate and including a first aperture which passes exposure light and a second aperture which defines a different area from the first aperture, a light blocking member which determines opening and closing of said shutter device and travels between said substrate and said cover plate to alternatively expose and block said first aperture and said second aperture, said second aperture being of varying width in the direction of travel of said light blocking member; and a travelling state detection device that detects the travelling state of said light blocking member using a light beam, wherein said second aperture is aligned with said travelling state detection device to allow said light beam to pass when the light blocking member does not block said second aperture.

11. The shutter device of claim 10, wherein said second aperture includes a V-shaped portion with varying width in the direction of travel of said light blocking means.

12. The shutter device of claim 10, wherein said second aperture is of rhombic shape.

13. The shutter device of claim 10, wherein said second aperture is of circular shape.

14. The shutter device of claim 10, wherein said second aperture is of elliptical shape.

15. The shutter device of claim 10, wherein said second aperture is of rectangular shape with one side tilted relative to the direction of travel of said light blocking means to provide a varying width opening in said direction of travel.

16. The shutter device of claim 10, further comprising a plurality of diaphragm plates, each plate including said first aperture and said second aperture, all of said second apertures being aligned with one another and with said traveling state detection device.

17. The shutter device of claim 10, wherein said traveling state detection device comprises:

a light emitter and a light receiver mounted on said substrate; and a mirror mounted on said cover plate, wherein light emitted from said light emitter may be reflected from said mirror through said second aperture to said light receiver.

18. A method of detecting the traveling state of a light blocking plate in a shutter device, comprising the steps of:

emitting light toward an aperture in a diaphragm plate of said shutter device, said aperture does not define an exposure aperture and being of varying width in a direction of travel of said light blocking plate;

allowing emitted light to pass through said aperture;

reflecting emitted light passed through said aperture from a reflecting surface so that the emitted light passes through said aperture again;

receiving the reflected light at a light receiver; and moving said light blocking plate in said first direction to block emitted light passing toward said aperture.

\* \* \* \* \*